(12) United States Patent
Davis et al.

(10) Patent No.: US 8,620,805 B2
(45) Date of Patent: Dec. 31, 2013

(54) METHODS AND SYSTEMS FOR PROCESSING PAYMENTS GLOBALLY OVER ONE OF A PLURALITY OF PROCESSING PATHS

(75) Inventors: Darren Davis, Sioux Falls, SD (US); Tom Koch, Sioux Falls, SD (US); John D. Miller, Hagerstown, MD (US); Eric Philips, Cincinnati, OH (US); Guy B. Sereff, Franklin, TN (US); Stacy Tobias, Sioux Falls, SD (US); Vasu Vemuri, Clear Spring, MD (US); Rochelle Wesselink, Tea, SD (US); Scott Tanguay, Kansas City, MT (US); Robert Strub, Cincinnati, OH (US); Caleb Williams, Sioux Falls, SD (US); Shamus Weiland, Ponte Vedra Beach, FL (US)

(73) Assignee: Citicorp Credit Services, Inc., Long Island, NY (US)

( * ) Notice: Subject to any disclaimer, the term of this patent is extended or adjusted under 35 U.S.C. 154(b) by 26 days.

(21) Appl. No.: 13/431,557

(22) Filed: Mar. 27, 2012

(65) Prior Publication Data
US 2013/0262292 A1    Oct. 3, 2013

(51) Int. Cl.
  *G06Q 40/00*    (2012.01)
(52) U.S. Cl.
  USPC .............................................. 705/39; 705/35
(58) Field of Classification Search
  USPC ..................................................... 705/35–45
  See application file for complete search history.

(56) References Cited

U.S. PATENT DOCUMENTS

| | | | |
|---|---|---|---|
| 7,606,766 | B2 | 10/2009 | Anderson et al. |
| 7,792,717 | B1 | 9/2010 | Hankins et al. |
| 7,822,644 | B2 | 10/2010 | Alberth, Jr. et al. |
| 7,822,663 | B2 | 10/2010 | Tyson-Quah |
| 7,970,673 | B2 | 6/2011 | Epple et al. |

(Continued)

FOREIGN PATENT DOCUMENTS

| | | |
|---|---|---|
| EP | 1107149 A2 | 6/2001 |
| GB | 2464133 A | 4/2010 |
| WO | WO 2007/136986 A2 | 11/2007 |
| WO | WO 2011/002547 A1 | 1/2011 |

OTHER PUBLICATIONS

Ayad, N. et al., "System Architecture for Cross Border Payment: A Case Study for the Financial Services Industry," Proceedings of the 36th Annual Hawaii IEEE International Conference on System Sciences, Jan. 6-9, 2003, pp. 1-10.

(Continued)

*Primary Examiner* — Richard C Weisberger
(74) *Attorney, Agent, or Firm* — John M. Harrington; Johnson, Marcou & Isaacs, LLC

(57) ABSTRACT

Methods and systems of processing payments globally over one of a plurality of payment processing paths employ computer hardware and software for receiving a request to access a global payment utility, presenting a plurality of payment options by the global payment utility, and receiving information by the global payment utility consisting at least in part of a source of payment, a payment destination, and a user-designated payment vehicle. Upon receiving the information, one of a plurality of payment processing paths for the payment is selected according to a clearing rules aspect of a rules engine of the global payment utility, and the payment is routed for processing via the selected payment processing path.

19 Claims, 4 Drawing Sheets

(56) References Cited

U.S. PATENT DOCUMENTS

| | | |
|---|---|---|
| 8,011,577 B2 | 9/2011 | Mullen et al. |
| 2003/0229590 A1 | 12/2003 | Byrne et al. |
| 2008/0147516 A1 | 6/2008 | Rousso et al. |
| 2008/0154771 A1 | 6/2008 | Trickey et al. |
| 2008/0270246 A1 | 10/2008 | Chen |
| 2008/0288376 A1 | 11/2008 | Panthaki et al. |
| 2009/0138255 A1* | 5/2009 | Sterling et al. ............... 704/2 |
| 2010/0114764 A1 | 5/2010 | Cataline et al. |
| 2011/0166994 A1* | 7/2011 | Ross et al. ............... 705/40 |
| 2011/0184857 A1 | 7/2011 | Shakkarwar |
| 2011/0246374 A1 | 10/2011 | Franz |
| 2011/0295743 A1 | 12/2011 | Patterson |

OTHER PUBLICATIONS

Yang, Q et al., "Research on Online Payment Mode Based on Internet Banking Payment Gateway," IEEE International Conference on Convergence Information Technology, Nov. 21-23, 2007, pp. 2043-2048.

ip.com Prior Art Database, "Widgets for Financial Services," Nov. 6, 2008, pp. 1-15, IP.COM No. IPCOM000176150D.

International Search Report and Written Opinion dated Mar. 8, 2013 for counterpart PCT International Application No. PCT/US12/67528, pp. 1-10.

* cited by examiner

METHODS AND SYSTEMS FOR PROCESSING PAYMENTS GLOBALLY OVER ONE OF A PLURALITY OF PROCESSING PATHS

FIELD OF THE INVENTION

The present invention relates generally to the field of electronic financial transactions, and more particularly to methods and systems for processing payments globally over one of a plurality of electronic processing paths using a single global user interface and a rules engine to pull funds from a first account and push funds to a second account.

BACKGROUND OF THE INVENTION

Currently, creditors typically employ a fragmented collections model characterized by lack of a capability of accepting anything other than a check in the mail or a check or cash in person as payment of indebtedness. There is a present need for creditors, including financial institutions, to be able to accept not only checks from debtors that are mailed or delivered in person but also to be able to accept such payments electronically via other vehicles, such as electronic checks, automated teller machine (ATM) cards, debit cards, automated clearinghouse (ACH), and the like, without significantly increasing processing costs.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods and systems for processing payments globally over one of a plurality of processing paths described herein.

Embodiments of the invention may provide methods and systems for processing payments globally over one of a plurality of processing paths that involve, for example, receiving, using a financial institution processor, a request to access a global payment utility; presenting, using the financial institution processor, a plurality of payment options by the global payment utility; and receiving, using the financial institution processor, information by the global payment utility consisting at least in part of a source of payment, a payment destination, and a user-designated payment vehicle. Such methods and systems may further involve, for example, selecting, using the financial institution processor, one of a plurality of payment processing paths for the payment according to a clearing rules aspect of a rules engine of the global payment utility and processing, using the financial institution processor, the payment via the selected payment processing path In aspects of the invention, receiving the request to access the global payment utility may involve receiving the request to access the global payment utility from a user via a thin client interface. Receiving the request to access the global payment utility may further involve receiving a request to log on the global payment utility from the user via an Internet web page. Receiving the request to access the global payment utility may also involve receiving the request to access the global payment utility from an agent on behalf of the user. Receiving the request to access the global payment utility may additionally involve receiving the request to access the global payment utility from a user via an interactive voice response system.

In other aspects, presenting the plurality of payment options may involve presenting the plurality of payment options for a user by the global payment utility via a thin client interface. Presenting the plurality of payment options for the user may additionally involve presenting an option to pay an amount owed on an account by the user via the thin client interface. Presenting the plurality of payment options for the user may further involve presenting an option to pay an amount owed on an account of the user selected from a list of accounts consisting at least in part of a credit card account, an auto loan, a mortgage loan, a consumer finance loan, an installment loan, and a checking account overdraft via the thin client interface.

In additional aspects, presenting the option to pay the amount owed on the account of the user further comprises presenting the option to pay the amount owed on the account of the user in a language and a currency selected by a local language and currency aspect of the rules engine of the global payment utility based on an origin of the request to access the global payment utility. In further aspects, presenting the plurality of payment options may involve presenting an option to select a payment vehicle from a list of payment vehicles consisting at least in part of electronic check transaction, automated clearinghouse transaction, automated teller machine card transaction, or debit card transaction.

In still other aspects, receiving the information consisting at least in part of the source of payment may involve receiving entry of a source account identifier for the user. Receiving the information consisting at least in part of the payment destination may further involve receiving entry of a payment destination account identifier for the user. Additionally, receiving the information consisting at least in part of the user-designated payment vehicle may involve receiving entry of a selection of a payment vehicle from a list of payment vehicles consisting at least in part of electronic check transaction, automated clearinghouse transaction, automated teller machine card transaction, or debit card transaction.

In still further aspects, selecting one of the plurality of payment processing paths for the payment may involve selecting one of the plurality of payment processing paths by the clearing rules aspect of the rules engine of the global payment utility from a list of payment processing paths consisting at least in part of electronic check processing, automated clearing house processing, automated teller machine card processing or debit card processing. In addition, selecting one of the plurality of payment processing paths for the payment may involve selecting one of the plurality of payment processing paths for the payment by the clearing rules aspect of the rules engine of the global payment utility based at least in part on a comparison of costs of each of the payment processing paths.

In still additional aspects selecting one of the plurality of payment processing paths for the payment may involve selecting one of the plurality of payment processing paths for the payment by the clearing rules aspect of the rules engine of the global payment utility based at least in part on processing paths available via the user-designated payment vehicle. In other aspects, selecting one of the plurality of payment processing paths for the payment may involve selecting one of the plurality of payment processing paths for the payment by the clearing rules aspect of the rules engine of the global payment utility based at least in part on a location of the user.

In further aspects of the invention, processing the payment via the selected payment processing path may involve routing the payment for processing via one of electronic check processing, automated clearing house processing, automated teller machine card processing or debit card processing. Processing the payment via the selected payment processing path may further involve routing the payment to the selected payment processing path transparent to the user. In addition, processing the payment via the selected payment processing path may involve pulling a payment amount from the payment source and pushing the payment amount to the payment destination via the selected payment processing path.

In embodiments of the invention, the global payment utility provides a global, cross border electronic push/pull commerce concept in making consumer payments across channels, such as ATM, debit, electronic check, and automated clearinghouse (ACH), independent of loan type or debt category. The global payment utility enables a collections function of a financial institution to accept real-time electronic payments from consumers both within country and across borders using an end-user thin client interface and a rules engine to pull a payment from a first account and push the payment to a second account. The global payment utility is called as a service by a financial institution's business-specific applications and has a rules capability that is configurable by country.

The global payment utility for embodiments of the invention also makes use of multiple internal capabilities of the financial institution, such as global transaction services, financial transaction processing, and cards clearing. The global payment utility provides a single global user interface for which table parameters drive language and payment options to match local country conditions and requirements. In order to prevent keying errors, the global payment utility interface connects to in-country customer databases to pre-fill customer details. Further, payment rules of the global payment utility rules engine are enforced in real-time with easy-to-follow on-screen error and success messages.

Examples of different types of rules employed on the rules engine for embodiments of the invention include payment rules, clearing rules, fee rules, as well as other types of rules. The payment rules for the global payment utility rules engine establish parameters, for example, for minimum and maximum payment amounts, number of payments, minimum and maximum days for payments and frequency of payments. The clearing rules establish parameters, for example, for determination of an appropriate payment and a clearing path, using internal capabilities of the financial institution including, without limitation, global transaction services, financial transaction processing, and cards clearing. The fee rules establish parameters, for example, for different fees based on payment type. Other types of rules involve, for example, rules regarding payment methods available for various countries and rules regarding business lines and for local language and currency requirements.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide a global payment utility that enables a creditor, such as a financial institution to accept various types of debt payments, such as ATM and debit payments in the United States market and throughout the world, in a manner that allows selection of the lowest cost method to process and clear the payments. Thus, a user may be allowed to use the user's choice of payment vehicle, such as an ATM card or debit card, and embodiments of the invention select the most inexpensive way to clear the payment, whether it is via an ATM network or a debit network. Further, in a global aspect, embodiments of the invention enable this type of clearing of payments in at least one country in every region of the world. There is presently no means available, for example, in Latin America, Europe or Asia for a creditor to accept electronic payments using a single utility in all of these different markets. Typically, debtors currently make payments to creditors by mailing a check.

Embodiments of the invention provide a unique global electronic payment clearing capability, whether by check, ATM card, or debit card. The types of indebtedness on which payments may be made according to embodiments of the invention include, without limitation, credit card accounts, auto loans, mortgage loans, consumer finance loans, installment loans, and checking account overdrafts. International markets, such as Brazil, generally lack the connectivity or ability to accept electronic payments of indebtedness. Embodiments of the invention address this lack of connectivity in countries, such as Brazil, by connecting directly to a specific bank in Brazil to enable its customers to make payments electronically.

Figure 1:
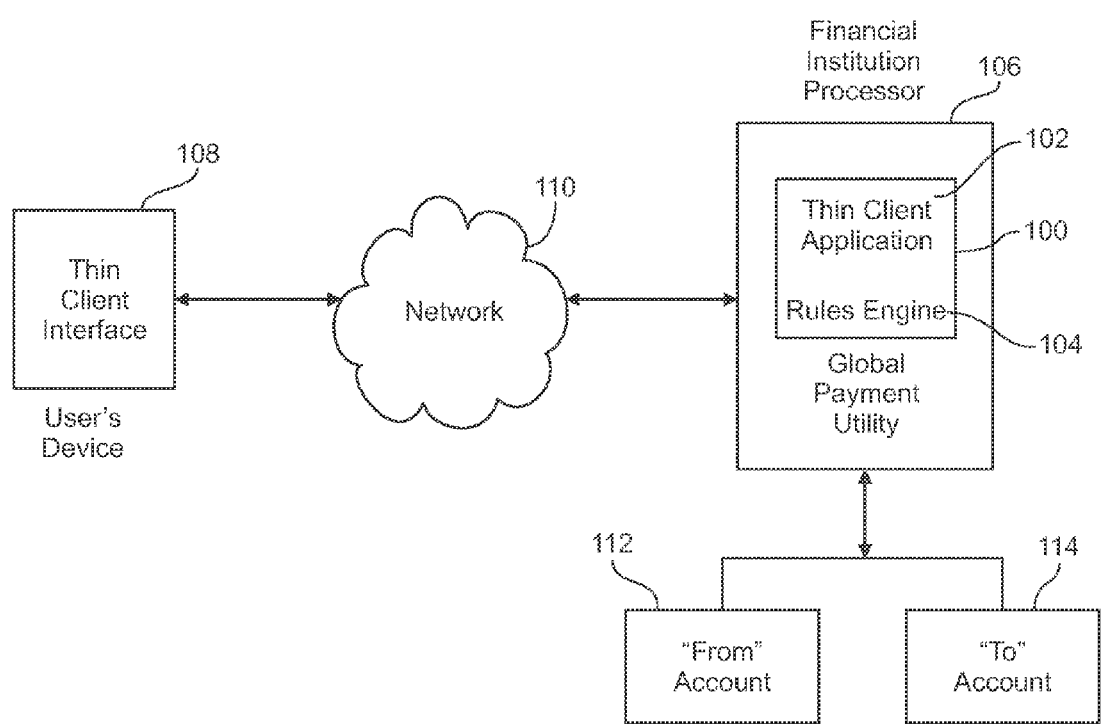
FIG. 1 is a schematic diagram that shows an overview example of key components and the flow of information between key components for the system for embodiments of the invention.

FIG. 1 is a schematic diagram that shows an overview example of key components and the flow of information between key components for methods and systems for embodiments of the invention. Referring to FIG. 1, the global payment utility 100 with a thin client application 102 and rules engine 104 may reside on one or more financial institution processors 106. A user using a user's electronic communication device 108 displaying a thin client interface may access the global payment utility 100 via a network 110, such as the Internet, and enter a real-time electronic payment request. Responsive to the request, the global payment utility 100, using the rules engine 104, may cause a payment to be pulled from a first account 112 and push the payment to a second account 114.

Embodiments of the invention employ an end-user thin client interface that is exposed, for example, to the Internet. The thin client application 102 may reside on any device 108 that can access the Internet and serve up Internet pages including, without limitation, a laptop, a smart phone, a tablet, a PC, or a desktop. It is to be noted that embodiments of the invention do not require a download of any software to the device 108 that is used to access the Internet. It also is to be understood that aspects of embodiments of the invention may also include use of the end-user thin client interface by a customer service agent on behalf of a user in communication with the customer service agent, for example, by telephone. It is to be further understood that aspects of embodiments of the invention may also include telephony access by a user using an interactive voice response system.

A key advantage of the global payment utility 100 for embodiments of the invention is that it is a single utility that may be deployed to clear payments electronically globally across different markets. Thus, the global payment utility 100 is configured such that if deployed in Brazil it presents the language and the currencies appropriate in that local market, and if deployed in some other part of the world, it presents language and currencies appropriate to such other part of the world. Another key advantage of the global payment utility 100 for embodiments of the invention is that it is designed as a service so that it may be exposed anywhere it is needed.

For example, the global payment utility 100 may be accessed through an internal Internet page by a customer service agent of the financial institution or it may be exposed to an external customer on the customer's device 108 as a payment presentation for a user online performing his or her own transaction without involving an agent. For another example, the global payment utility 100 may be exposed in a telephony transaction in which the user uses an interactive voice response system via a telephone. In either example, the method and system for embodiments of the invention calls out to a single application to receive the correct information and clear the transaction.

As previously mentioned, it is not necessary to have any specially designed software on the user's communication device 108, such as the user's mobile phone, to access the global payment utility 100 for embodiments of the invention. Instead, in embodiments of the invention, a user may access web pages via the Internet, whereupon the user may be presented with options to make a single payment or to make recurring payments. As noted, embodiments of the invention may allow a user to access the global payment utility 100 via the Internet, or the user may engage a customer service agent by telephone or in person and have the agent access the global payment utility 100 on behalf of the user. Thus, the user may access the global payment utility 100 for embodiments of the invention by logging on a website or by calling an agent to log on the website.

Assume, for example, that the user is a cardholder who misses a payment on credit card account and is therefor classified by the card issuer as delinquent. In embodiments of the invention, when the user attempts to log on, for example to the credit card website, the user may be presented with a graphical user interface (GUI) screen on the user's device 108 that gives the user information about the amount owed on the account. The user is prompted to make a payment and is also presented with options to select one of several different ways to make the payment, such as by check, by an ACH transaction, by ATM transaction, or by debit transaction.

Figure 2:
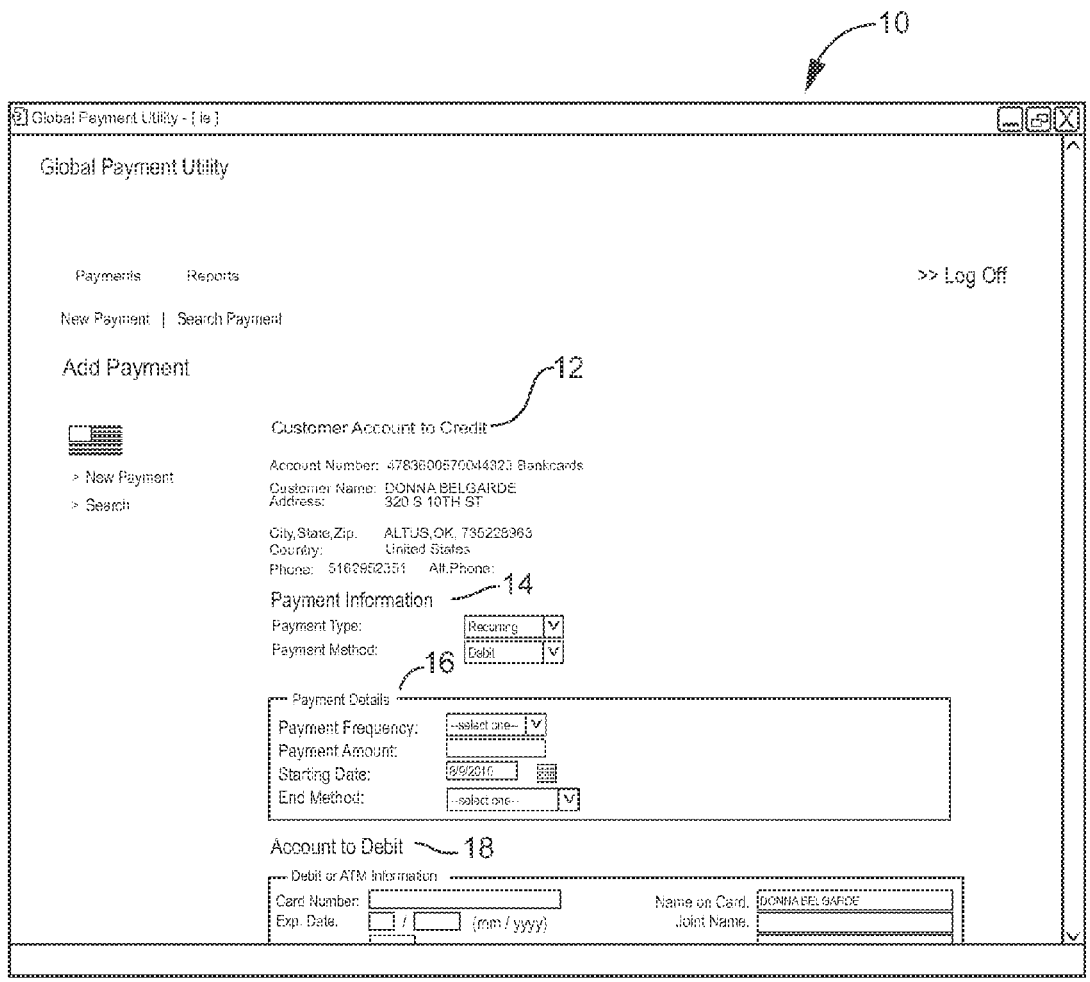
FIG. 2 is a sample English language screen shot for the global payment utility end-user thin client interface for embodiments of the invention.

FIG. 2 is a sample English language screen shot 10 for the global payment utility end-user thin client interface for embodiments of the invention. Referring to FIG. 2, the global payment utility interface screen may present fields, for example, for entry of a customer account to credit 12, payment information 14, payment details 16, and an account to debit 18. A user may be prompted to enter a payment destination account identifier and user details in the customer account to credit field 12. In addition, the user may be prompted to select a payment type and payment method in the payment information field 14. Further, the user may be prompted for selection of a payment frequency, entry of a payment amount, and selections of a starting date and an end method in the payment details field 16. The user may also be prompted for entry of a debit or ATM card number, a card expiration date, and a cardholder name in the account to debit field 18.

The user may self-select making a payment in the customer account to credit field 12 and input information about a source account in the account to debit field 18. The source account may be an account with the financial institution that provides the global payment utility 100 for embodiments of the invention or with any other bank within the user's country that is, for example, on the ATM or debit network. The user may input the source bank information in the account to credit field 12, as well as a frequency of occurrence and a payment amount in the payment details field 16, and submit the transaction. Upon submitting the transaction the user may receive an electronic confirmation that the transaction has been received. Thereafter, the payment may be processed through the appropriate channel to clear.

Thus, if the user selects payment by check, the transaction may be processed via a normal check-processing route. If the user selects payment by ATM or debit, the transaction may be processed via the normal ATM or debit-processing network. In the latter case, the user may enter, for example, his or her ATM card number in the account to debit field 18, and computer logic of the global payment utility 100 for embodiments of the invention selects the most cost-effective processing path, which may be ATM or debit, depending on the processing paths that are available via the particular card that was entered.

Possible alternative channels of source payment and processing paths for embodiments of the invention include, without limitation, ATM, debit, ACH or check. In an aspect of embodiments of the invention, a user may be allowed to select payment via check or ACH. In other aspects, the user may be allowed to select ATM or debit, in addition to check or ACH, in which case, the transaction may be processed via the ATM or debit network, whichever is determined to be the most cost-effective to clear the transaction. In embodiments of the invention, the user may be charged a transaction fee based on the channel through which the user chooses to clear payment. When the user wishes to select payment via ATM, the user may enter the user's ATM identifier, such as the user's sixteen-digit ATM card number, on the account to debit field 18 of the global payment utility interface screen 10. Alternatively, the user may call an agent to interact with the global payments utility on behalf of the user, read his or her ATM number to the agent, and have the agent enter the user's ATM number for the user.

Figure 3:
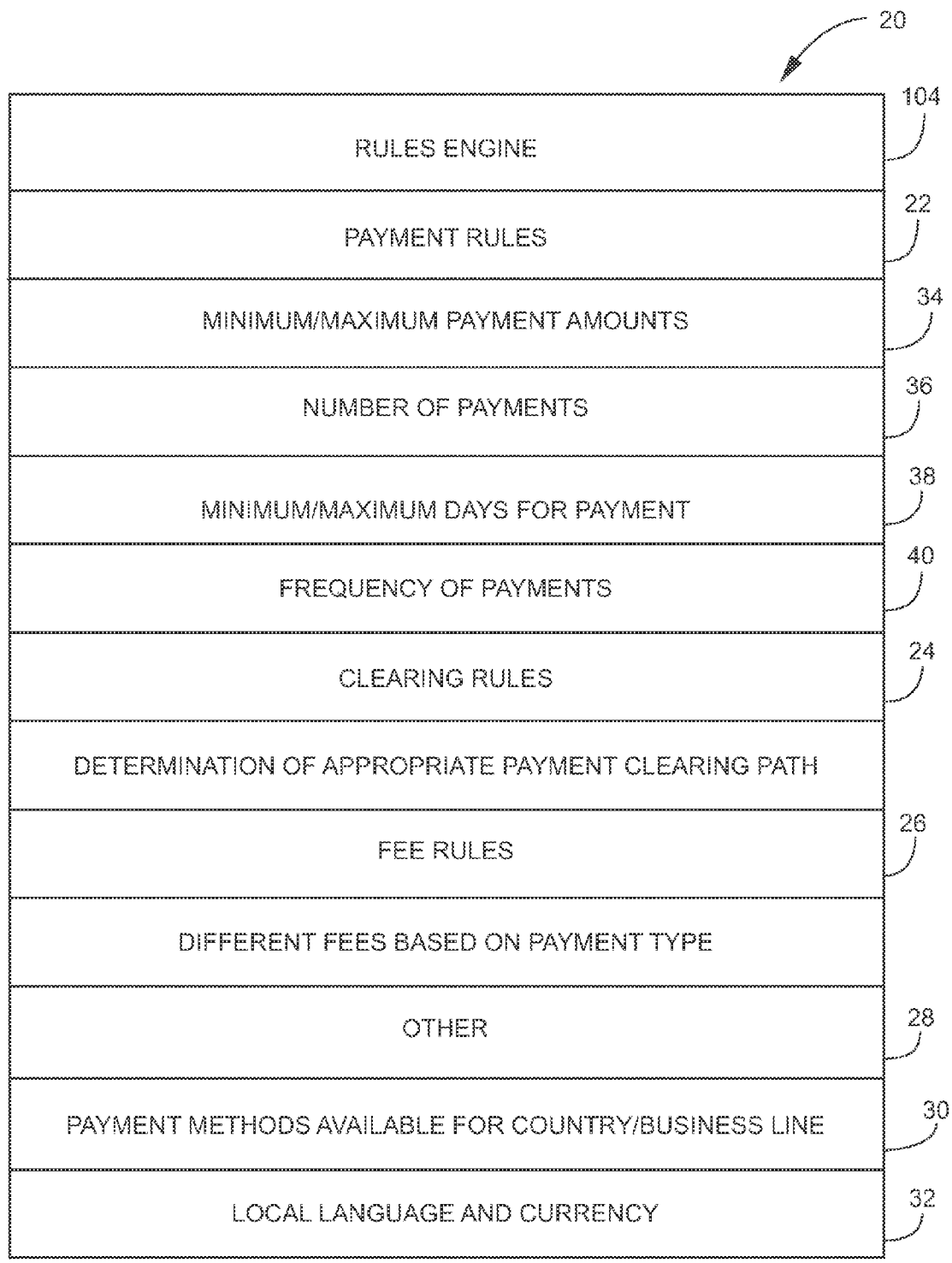
FIG. 3 is a table that illustrates examples of different types of rules of the rules engine for embodiments of the invention.

As previously noted, the global payment utility 100 for embodiments of the invention employs a rules engine 104 with different types of rules. FIG. 3 is a table 20 that illustrates examples of different types of rules of the rules engine 104 for embodiments of the invention. Such rules may include, without limitation, payment rules 22, clearing rules 24, fee rules 26, and other types of rules 28, such as payment method rules 30, and local language and currency rules 32. In embodiments of the invention, local language and currency rules 32 assure that amounts such as the amount owed by the user are presented in local currency on the screen in the local language. Likewise, amounts such as the payment amount which the user wishes to pay are entered in the local currency on the screen in the local language. Thus, if the user logs on the global payment utility 100 for embodiments of the invention in Brazil, the global payment utility 100 presents and accepts entry of amounts in Brazilian reals on the screen in Portuguese. Similarly, if the user logs on in Spain, the global payment utility 100 presents and accepts entry of amounts in euros on the screen in Spanish.

The payment rules 22 for embodiments of the invention may relate, for example, to minimum and maximum payment amounts 34, number of payments 36, minimum and maximum number of days for payments 38, and frequency of payments 40. The minimum payment amount and frequency rules aspects 34, 40 may relate, for example, to requirements, such as regulatory requirements, for making minimum payment amounts when paying down portions of a loan, as well as making those payments at certain frequencies. For example, the rules engine 104 may peg a user's payment to a required minimum amount that may vary based on the loan balance of the user. Thus, it is not necessary for the user to know the user's monthly payment amount, which may vary.

Instead, the user may be presented with an option by the minimum payment amount rules aspect 34 of the global payment utility 100 for a selection simply to pay the user's minimum monthly payment of a particular extended period of time. The minimum payment amount and frequency rules aspects 34, 40 of embodiments of the invention offer a key advantage by greatly simplifying payment structures for users which may be subject to change monthly, for example, as additional account charges may be made by the user from time-to-time each month. The number of payments rules aspect 36 for embodiments of the invention relates to the number of recurring payments. Thus, this aspect may establish a maximum number, such as 100 monthly payments over a little more than eight years, as the equivalent of recurring payments for the life of a loan. It is to be understood that the forgoing example of a maximum number of monthly payments is an example only and that embodiments of the invention are not limited to any particular number of recurring payments. The maximum and minimum days rules aspect 38 may allow the user, for example, to enter a date for the user's payment to be withdrawn each month. The frequency of payments rules aspect 40 may enable the user to select the frequency of the user's payments, such as monthly or weekly. Thus, embodiments of the invention may allow the user to select, for example, weekly or monthly payments, the day of the week or month for payments, and the number of payments.

A key feature of embodiments of the invention is the clearing rules aspect 24 which may determine the least expensing channel for processing payments. As previously noted, when a user enters a selection for a particular payment method, such as ACH, check, ATM, or debit, computer logic of the global payment utility 100 for embodiments of the invention may determine the least expensive processing path and route the payment down that path. For example, when a user in Spain logs on the global payment utility 100 and selects 'check' for the payment method, computer logic of the global payment utility 100 may route the payment to the most cost-effective check-processing channel for Spain.

It is currently a practice in some countries to combine functions of a debit card and an ATM card into a single card which can be used both in an ATM network and a debit network. Thus, when a user who is a cardholder of such a combined-function card accesses the global payment utility 100 for embodiments of the invention and selects either ATM or debit as the method of payment, computer logic of the global payment utility 100 may determine the most cost-effective processing path and route the payment down that path. In such case, the user has no reason to care which processing path is used but the financial institution does, because each network has different interchange implications for the financial institution. Therefore, computer logic of the global payment utility 100 routes the transaction down the cheaper processing path, which is completely transparent from the user's perspective. It is to be noted that embodiments of the invention may leverage certain infrastructure of a global financial institution, such as its ATM/debit network, to enable electronic payments globally. It is to be further noted that embodiments of the invention may leverage other infrastructure of the global financial institution, such as its global transaction system, to enable check payments electronically.

According to embodiments of the invention, it does not matter where the user's source account is located or with what financial institution it is held. The source account may be, for example, a demand deposit account (i.e., a checking account) of the user with a financial institution other that the financial institution that provides the global payment utility 100. In that case, when the user wishes to select the check method of payment, the user may simply enter information such as the user's checking account number, the amount of the payment, and a bank routing number. Thereupon, regardless of the source financial institution, the funds for the payment will be drawn from the designated account and applied, for example, against the user's loan account balance. The fee rules aspect 26 for embodiments of the invention relate to an assessment of fees, for example, for providing the payment service for embodiments of the invention.

An aspect of embodiments of the invention may involve, for example, pulling payments from one or more accounts 112 at a particular financial institution and pushing those payments to a list of multiple accounts 114. For example, a business entity may furnish the financial institution that provides the global payment utility 100 for embodiments of the invention a list of accounts and customer names. The financial institution may in turn furnish each customer on the list with a unique log in credential with which the business entity's customers may log on the global payment utility 100 and pull funds from their respective bank accounts 112, regardless of the bank, and push those funds to an account 114 of the business entity. In this example, a manufacturer selling its products may offer its customer an ability to make electronic payments for its products. Likewise, a service provider, such as a cable service provider, may likewise offer its subscribers the ability to make electronic payments for its services. It is to be noted that in either case, it is not necessary for either or both of the vendors and their customers to have their accounts with the financial institution providing the global payment utility 100 for embodiments of the invention.

The payment methods available for country/business line rule aspect 30 for embodiments of the invention may deal with an issue, such as payment method limitations in some countries, for example, outside the United States. In certain countries including the United States, the four predominant payment methods include, for example, ACH, check, ATM, and debit. However, in some countries, such as Brazil, there is no currently available electronic check-clearing network. To address this issue, a global financial institution may build such a network by partnering, for example, with a local bank and setting up a connection with the local bank. Thus, while all four of the predominant payment methods common in the United States may not be available in every country outside the United States, computer logic of the rules engine 104 for embodiments of the invention may configure the applicable processing channels based on the country.

Figure 4:
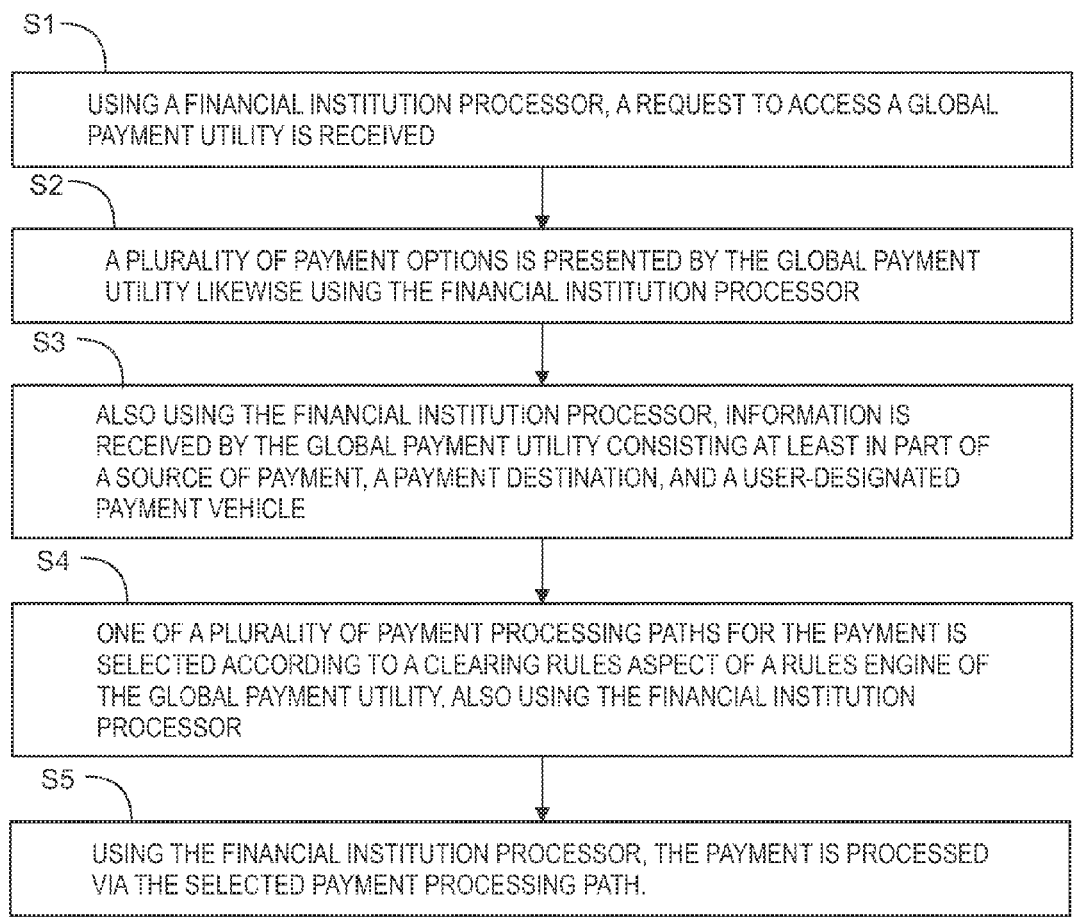
FIG. 4 is a flow chart that illustrates an overview example of processing payments globally over one of a plurality of processing paths for embodiments of the invention.

In the local language and currency rule aspect 32, when a user logs on the global payment utility 100 for embodiments of the invention, based on the origin of the log-in, computer logic of the global payment utility 100 determines the language in which the screen should be presented and the currency in which the payments should be made and configures itself based on local country regulatory requirements. In the event, for example, a law is passed in a particular country that prohibits electronic check clearing, a simple rule change may be made in the global payment utility 100 that prevents the check payment channel from being visible on the menu to user's logging on in that particular country in the future FIG. 4 is a flow chart that illustrates an overview example of processing payments globally over one of a plurality of processing paths for embodiments of the invention. Referring to FIG. 4, at S1, a request to access the global payment utility 100 may be received, for example, from a user via a thin client interface displayed on the user's device 108. Alternatively, the request may be received from an agent on behalf of the user, or the user may access the global payment utility 100 via telephony using an interactive voice response system. At S2, a plurality of payment options for the user may be presented by the global payment utility 100. In one aspect, an option to pay an amount owed on an account by the user may be presented. Such accounts owed by the user may include, without limitation, credit card, auto loan, mortgage loan, consumer finance loan, installment loan or checking account overdraft.

In any event, the payment options may be presented in a language and currency selected by the local language and currency rule aspect 32 of the rules engine 104 of the global payment utility 100 based on the origin of the request to access the global payment utility 100. Further, the plurality of payment options presented may include an option to select a payment vehicle from a list of payment vehicles including, without limitation, electronic check transaction, automated clearinghouse transaction, automated teller machine card transaction, or debit card transaction.

Referring further to FIG. 4, at S3, information may be received by the global payment utility 100 including, without limitation, a source of payment, a payment destination, and a user-designated payment vehicle. The source of payment information may include a source account identifier for the user, and the payment destination information may likewise include a payment destination account identifier. Further, the user-designated payment vehicle may include a selection for the user from a list of payment vehicles including, without limitation, electronic check transaction, automated clearinghouse transaction, automated teller machine card transaction, or debit card transaction.

Referring again to FIG. 4, at S4, one of a plurality of payment processing paths for the payment may be selected according to the clearing rules aspect 24 of the rules engine 104 of the global payment utility 100. The payment path that is selected may be selected from a list of payment paths including, without limitation, electronic check processing, automated clearinghouse processing, automated teller machine card processing, or debit card processing. Such selection may be made by the clearing rules aspect 24 of the rules engine 104 based at least in part, for example, on a comparison of costs of each of the payment processing paths and/or at least in part on the processing paths available via the user-designated payment vehicle and/or at least in part on the location of the user Referring once more to FIG. 4, at S5, the payment may be processed via the selected payment processing path, for example, by routing the payment for processing via one of electronic check processing, automated clearinghouse processing, automated teller machine card processing, or debit card processing. It is to be understood that the payment may be muted to the selected payment process which may be different from the user-designated payment vehicle but which routing is transparent to the user. In any event, processing the payment may involve pulling a payment amount from the payment source account 112 and pushing the payment amount to the payment destination account 114.

In embodiments of the invention, users may register as users of the global payment utility 100, but it is not necessary for a payee to be registered. Such registration may be governed by local laws and regulations such that in some countries, actual physical signatures may be required and in other countries electronic signatures may be acceptable.

In alternative embodiments, the global payment utility 100 may be used to make person-to-person payments, regardless of source bank account and destination bank account.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices

What is claimed is:

1. A method of processing payments globally over one of a plurality of payment processing paths, comprising:
    receiving, using a financial institution processor, a request to access a global payment utility;
    presenting, using the financial institution processor, a plurality of payment options by the global payment utility;
    receiving, using the financial institution processor, information by the global payment utility consisting at least in part of a source of payment, a payment destination, and a user-designated payment vehicle;
    selecting, using the financial institution processor, one of a plurality of payment processing paths for the payment according to a clearing rules aspect of a rules engine of the global payment utility based at least in part on payment processing paths available via the user-designated payment vehicle and at least in part on a comparison of processing costs of each of the payment processing paths available via the user-designated payment vehicle; and
    processing, using the financial institution processor, the payment via the selected payment processing path.

2. The method of claim 1, wherein receiving the request to access the global payment utility further comprises receiving the request to access the global payment utility from a user via a thin client interface.

3. The method of claim 2, wherein receiving the request to access the global payment utility via the thin client interface further comprises receiving the request to access the global payment utility from the user via an Internet web page.

4. The method of claim 2, wherein receiving the request to access the global payment utility further comprises receiving the request to access the global payment utility from an agent on behalf of the user.

5. The method of claim 1, wherein receiving the request to access the global payment utility further comprises receiving the request to access the global payment utility from a user via an interactive voice response system.

6. The method of claim 1, wherein presenting the plurality of payment options further comprises presenting the plurality of payment options for a user by the global payment utility via a thin client interface.

7. The method of claim 6, wherein presenting the plurality of payment options for the user via the thin client interface further comprises presenting an option to pay an amount owed on an account by the user via the thin client interface.

8. The method of claim 6, wherein presenting the plurality of payment options for the user further comprises presenting an option to pay an amount owed on an account of the user selected from a list of accounts consisting at least in part of a credit card account via the thin client interface.

9. The method of claim 8, wherein presenting the option to pay the amount owed on the account of the user further comprises presenting the option to pay the amount owed on the account of the user in a language and a currency selected by a local language and currency aspect of the rules engine of the global payment utility based on an origin of the request to access the global payment utility.

10. The method of claim 1, wherein presenting the plurality of payment options further comprises presenting an option to select a payment vehicle from a list of payment vehicles consisting at least in part of an automated clearinghouse transaction.

11. The method of claim 1, wherein receiving the information consisting at least in part of the source of payment further comprises receiving entry of a source account identifier for the user.

12. The method of claim 1, wherein receiving the information consisting at least in part of the payment destination further comprises receiving entry of a payment destination account identifier for the user.

13. The method of claim 1, wherein receiving the information consisting at least in part of the user-designated payment vehicle further comprises receiving entry of a selection of a payment vehicle from a list of payment vehicles consisting at least in part of an automated clearinghouse transaction.

14. The method of claim 1, wherein selecting one of the plurality of payment processing paths for the payment further comprises selecting one of the plurality of payment processing paths by the clearing rules aspect of the rules engine of the global payment utility from a list of payment processing paths consisting at least in part of automated clearing house processing.

15. The method of claim 1, wherein selecting one of the plurality of payment processing paths for the payment further comprises selecting one of the plurality of payment processing paths for the payment by the clearing rules aspect of the rules engine of the global payment utility based at least in part on a location of the user.

16. The method of claim 1, wherein processing the payment via the selected payment processing path further comprises routing the payment for processing via one of a group of payment processing paths consisting at least in part of automated clearing house processing.

17. The method of claim 1, wherein processing the payment via the selected payment processing path further comprises routing the payment to the selected payment processing path transparent to the user.

18. The method of claim 1, wherein processing the payment via the selected payment processing path further comprises pulling a payment amount from the payment source and pushing the payment amount to the payment destination via the selected payment processing path.

19. A system for processing payments globally over one of a plurality of processing paths, comprising:
    a financial institution processor coupled to memory, wherein the financial institution processor is programmed for:
    receiving a request to access a global payment utility;
    presenting a plurality of payment options by the global payment utility;
    receiving information by the global payment utility consisting at least in part of a source of payment, a payment destination, and a user-designated payment vehicle;
    selecting one of a plurality of payment processing paths for the payment according to a clearing rules aspect of a rules engine of the global payment utility based at least in part on payment processing paths available via the user-designated payment vehicle and at least in part on a comparison of processing costs of each of the payment processing paths available via the user-designated payment vehicle; and
    processing the payment via the selected payment processing path.

* * * * *